Dec. 30, 1969   J. E. BRUNLID   3,486,964
SHEET MATERIAL HAVING AN OVERLAP SEAM
AND METHOD OF FORMING SAME
Filed Feb. 28, 1966

INVENTOR
John Erik Brunlid

BY Pierce, Scheffler & Parker
ATTORNEYS

United States Patent Office 3,486,964
Patented Dec. 30, 1969

3,486,964
SHEET MATERIAL HAVING AN OVERLAP SEAM
AND METHOD OF FORMING SAME
John Erik Brunlid, Lund, Sweden, assignor to AB Tetra
Pak, Lund, Sweden, a Swedish company
Filed Feb. 28, 1966, Ser. No. 530,478
Claims priority, application Sweden, Mar. 6, 1965,
2,953/65
Int. Cl. B32b *3/14, 3/10*
U.S. Cl. 161—38                                    2 Claims

ABSTRACT OF THE DISCLOSURE

Two margins of sheet material are joined by an overlap seam with one margin overlying the other margin and with its free edge abutting against and sealed to a ridge formed in the sheet material adjacent to said other margin. Thus when the sheet material consists of two outer plastic layers and an intermediate porous layer such as paper and the margins are joined by heat sealing a continuous plastic surface is formed and the free edge of the intermediate layer is covered with plastic.

---

The present invention refers to a method of and to the product formed by joining sheet or web material by means of an overlap seam, i.e. a seam or joint in which two margins of two separate pieces of material or two different margins of the same piece of material are caused to overlap each other and are joined in this overlapping position. The method according to the invention is characterized by the fact that at a distance of substantially the width of the joint from the free edge of one of the parts of material to be joined there is produced an elevation in parallel with this free edge, and that the other one of the parts of material to be joined is caused to overlap the first mentioned part to such extent that the free edge thereof in the finished joint engages said elevation.

Preferably, the invention is applied to the joining of plastic covered material, the elevation characteristic of the invention being produced on a plastic covered side of the material, for example by means of a stamping wheel running on the opposite side of the material.

In the case of plastic covered material the joining of the parts of material is preferably carried out by means of heat sealing. In the case of a material covered with plastic on both sides the plastic on the top side of the elevation may be caused to fuse with the two plastic layers of the other part of material, whereby an efficient enclosure and seal is obtained for the inner layer of this second part of material. This is a very substantial advantage in the case where this inner layer consists of a porous material, for example paper, and where this part is to be situated innermost in a package having an overlap seam which has been produced according to the invention. In this case it will be possible through the invention to produce a package having a continuous inner plastic layer in a simple way. For example, by applying the invention one may produce such a continuous inner plastic layer in packages which have been produced by successive flat-pressing and transverse sealing of a tube formed from a web material, the method according to the invention thus being applied to the longitudinal joint of the tube.

Figure 1:
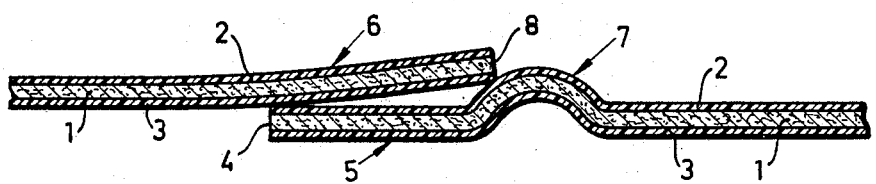
Figure 2:
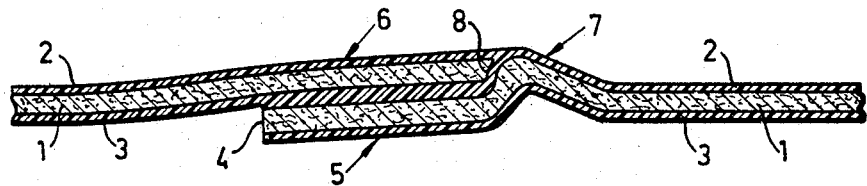

The invention is described more closely in the following with reference to the accompanying drawing, which by way of example shows an embodiment of a joint produced by the method according to the invention, FIG. 1 showing two margins of sheet material laid loosely one upon the other, while FIG. 2 shows the same margins of sheet material after heat sealing under pressure.

The pieces of material shown in FIG. 1, which may form parts of web or sheet materials, both consist of an intermediate layer 1 of for example paper and two coating layers 2 and 3 for example of plastic. According to the invention, at a distance of substantially the width of the joint from the free edge 4 of one of the parts of material 5 and 6 to be jointed there has been produced an elevation 7 in parallel with the edge 4. The other one of the parts of material to be joined, i.e. the part 6, has further been brought into overlapping position in relation to the part 5 to such extent that the free edge 8 thereof engages the elevation 7. If now the part 5 and 6 of material and the elevation 7 are pressed together between a heating jaw and a back support, the result will be the joint shown in FIG. 2, in which the plastic layer 2 of the elevation 7 has been caused to fuse with the two plastic layers 2 and 3 of the part 6. Thereby, as will be seen, a continuous plastic layer has been obtained on the top side of the material shown in FIG. 2, i.e. the two plastic layers 2 have fused together, at the same time as the free cut edge 8 of the paper layer 1 of the part 6 has been efficiently enclosed.

Of course, the invention is not limited only to the example described above but may be varied within the scope of the following claims. For example, it has been supposed above that the elevation 7 has been produced by means of stamping wheel running on the opposite side of the material. Of course, the elevation may be produced in many other ways, for example by creasing or bending the material in any suitable way. Furthermore, it is of course also possible to enclose the other free edge of material, i.e. the edge 4, in the same way. Further, the materials of the various layers may be varied. Preferably, polyethylene or polypropylene is intended to be used for the layers 2 and 3, while the layer 1 conveniently consists of paper.

I claim:
1. A method of forming an overlap seam between two margins of sheet material which consists of two plastic layers and a porous intermediate layer comprising the steps of: forming a ridge adjacent to one margin, overlapping the other margin over said one margin with the free edge of said other margin abutting against said ridge, heat sealing the plastic layer of the convex surface to the free edge of one of said plastic layers of said overlapping margin and extending said plastic layer of said convex surface across the free edge of said intermediate layer and heat sealing said plastic layer of said convex surface to the other free edge of the other plastic layer of said overlapping sheet material.

2. A sheet material having an overlap seam between margins of two parts thereof, said sheet material comprising at least two plastic layers with an intermediate porous layer, one of said parts having a ridge therein, the other of said parts abutting against said ridge and being heat sealed thereto so that the plastic layer on the convex side of said ridge is heat sealed to the free edges of the plastic layers of the other of said parts and extending across the free edge of the intermediate layer.

References Cited

UNITED STATES PATENTS

| | | | |
|---|---|---|---|
| 2,550,520 | 4/1951 | Bennett | 161—145 XR |
| 2,442,936 | 6/1948 | Rohdin | 156—203 XR |

FOREIGN PATENTS 319,680   4/1957   Switzerland.

EARL M. BERGERT, Primary Examiner

P. DIER, Assistant Examiner

U.S. Cl. X.R.

156—157, 203, 306; 161—145; 229—48